United States Patent [19]

Dujardin et al.

[11] Patent Number: 4,874,816

[45] Date of Patent: Oct. 17, 1989

[54] VINYL COPOLYMERS WITH GRAFTED-ON POLYCARBONATE CHAINS, THEIR PRODUCTION AND USE

[75] Inventors: Ralf Dujardin; Wolfgang Ebert; Rolf-Volker Meyer; Klaus Berg, all of Krefeld; Ulrich Grigo, Kempen; Wolfgang Wehnert, Krefeld, all of Fed. Rep. of Germany

[73] Assignee: Bayer Aktiengesellschaft, Leverkusen, Fed. Rep. of Germany

[21] Appl. No.: 194,648

[22] Filed: May 13, 1988

[30] Foreign Application Priority Data

May 22, 1987 [DE] Fed. Rep. of Germany ....... 3717172

[51] Int. Cl.$^4$ ............................................. C08L 69/00
[52] U.S. Cl. ................................. 525/146; 525/359.3; 525/468
[58] Field of Search ..................... 525/145, 359.3, 464, 525/468

[56] References Cited

U.S. PATENT DOCUMENTS

| 3,687,895 | 8/1972 | Vernaleken et al. | 260/47 |
| 3,758,597 | 9/1973 | Buysch et al. | 260/613 |
| 3,856,886 | 12/1974 | Margotte et al. | 260/873 |
| 3,991,009 | 11/1976 | Margotte et al. | 260/42 |
| 4,172,103 | 10/1979 | Serini et al. | 525/76 |
| 4,657,980 | 4/1987 | Fujita et al. | 525/146 |

FOREIGN PATENT DOCUMENTS

| 199824 | 11/1986 | European Pat. Off. . |
| 1153527 | 8/1963 | Fed. Rep. of Germany . |
| 61-019656 | 1/1986 | Japan . |
| 1321553 | 6/1973 | United Kingdom . |
| 1321555 | 6/1973 | United Kingdom . |

OTHER PUBLICATIONS

Angewandte Makromolekulare Chemie 60/61, 1977, pp. 125–137, No. 861.

*Primary Examiner*—Theodore E. Pertilla
*Attorney, Agent, or Firm*—Gene Harsh; Joseph C. Gil; Aron Preis

[57] ABSTRACT

The invention relates to a process for the production of vinyl copolymers with grafted-on polycarbonate chains, to the grafted vinyl copolymers obtainable by the process according to the invention, to their use as modifiers for mixtures of thermoplastic polycarbonates and thermoplastic polystyrenes, to such mixtures themselves and to the use of such mixtures as substrates for optical discs.

3 Claims, 3 Drawing Sheets

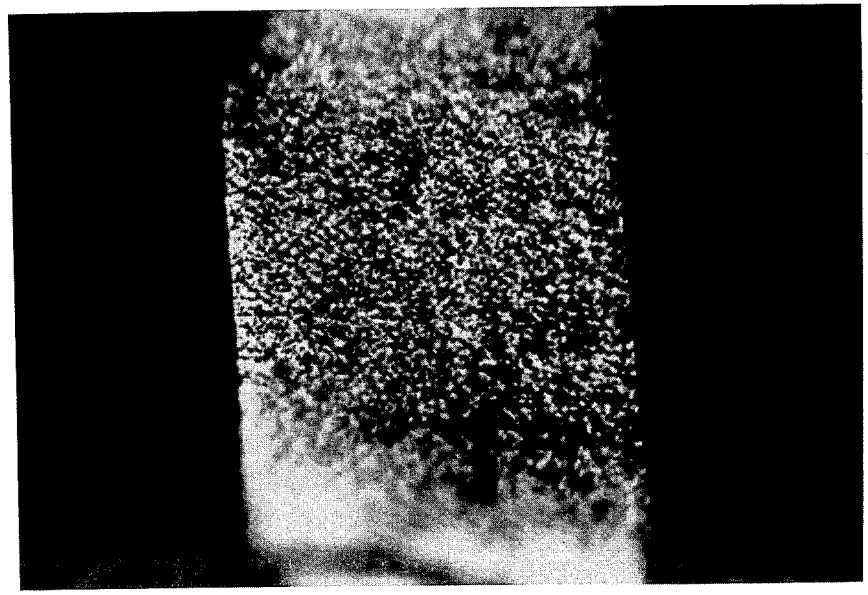
FIG. 3    $\overleftrightarrow{10\mu m}$
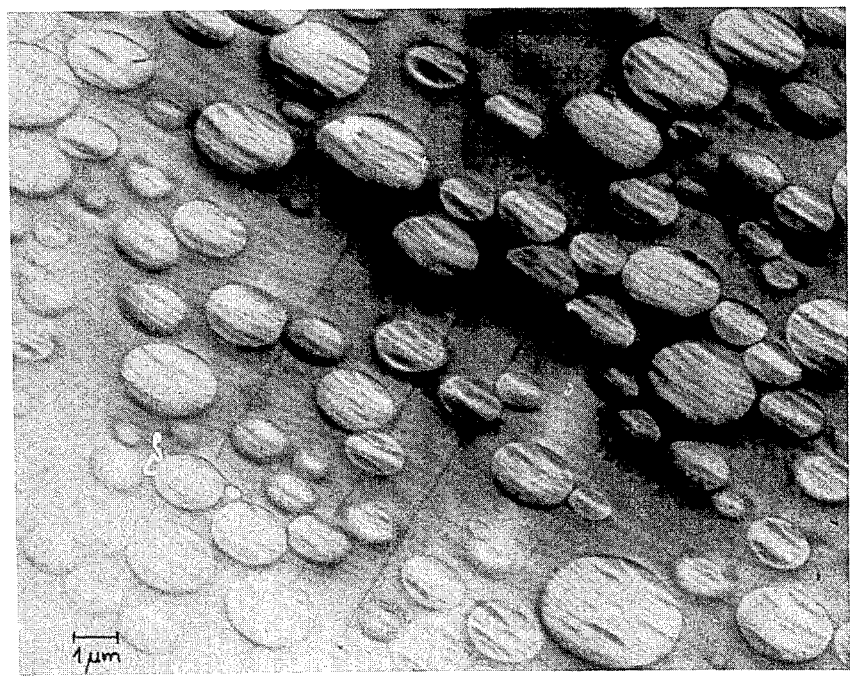
FIG. 4

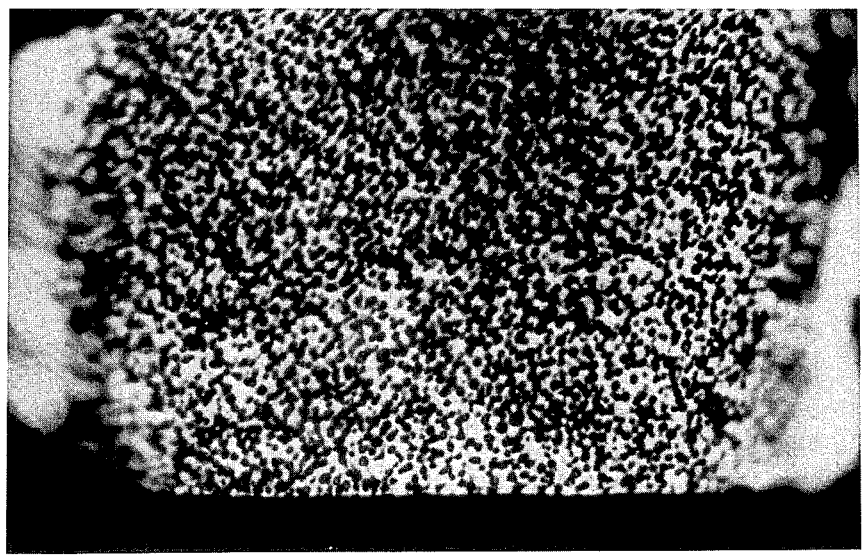
FIG. 5 ⊢10μm⊣
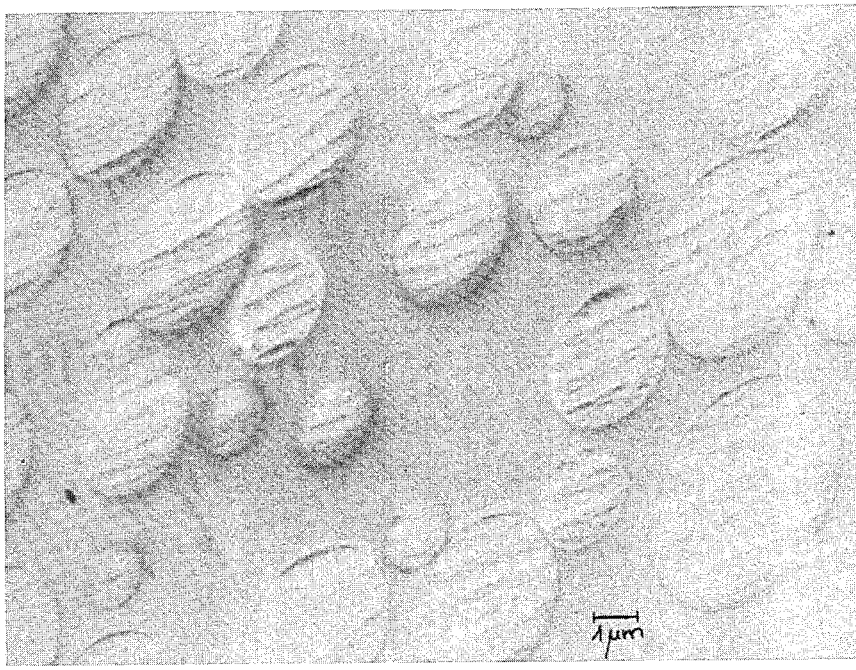
FIG. 6

VINYL COPOLYMERS WITH GRAFTED-ON POLYCARBONATE CHAINS, THEIR PRODUCTION AND USE

This invention relates to a process for the production of vinyl copolymers with grafted-on polycarbonate chains, of which the vinyl copolymer graft base has an $\overline{M}n$ (number average molecular weight determined by gel permeation chromatography) of 45 000 to 95 000, of which the polycarbonate chains have a degree of polycondensation of recurring carbonate structural units of 35 to 70 and in which the ratio by weight of vinyl copolymer graft base to grafted-on polymer chains is between 35% by weight to 65% by weight and 55% by weight to 45% by weight, characterized in that 95 mole % to 99.5 mole % of styrene and 5 mole % to 0.5 mole % of compounds corresponding to the following formula

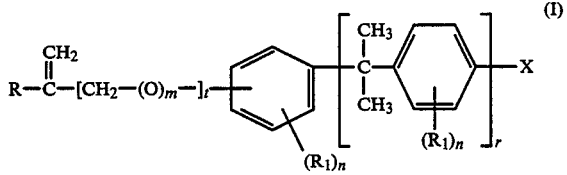

in which
R=H or $C_1$-$C_4$ alkyl,
$R_1$=Cl, Br, $C_1$-$C_4$ alkyl, cyclohexyl or $C_1$-$C_4$ alkoxy,
m=0 or 1,
n=0, 1 or 2,
r=0 or 1 and
t=0 or 1 and
Le A 25 000
X=—O—Si(CH$_3$)$_3$, are copolymerized in known manner by radically initiated mass polymerization to a desired molecular weight ($\overline{M}n$, number average molecular weight) of 45 000 to 95 000, after which the polymer is reacted without isolation with diphenols, phosgene and monophenols under the conditions of the two-phase interfacial process in aqueous-alkaline phase with addition of an inert organic solvent, the quantity of diphenol being selected so that the content of polycarbonate chains in the grafted vinyl copolymer is between 65% by weight and 45% by weight, based on the total weight of the grafted vinyl copolymer, including grafted-on polycarbonate chains, and the quantity of chain terminator being gauged so that the average chain length of the grafted-on polycarbonate side chains comprises between 35 and 70 recurring carbonate structural units and the quantity of inert organic solvent having to be gauged in such a way that the final viscosity of the organic phase of the reaction mixture is between 5 and 25 mPa.s and preferably between 10 and 20 mPa.s.

The final viscosity is understood to be the absolute viscosity of the organic phase of the reaction mixture on completion of polycondensation at 20° C., as measured with a Höppler viscosimeter.

DE-AS No. 1 153 527 describes a process for the production of copolymers containing phenol residues as side chains from unsaturated phenols and other olefinic compounds. The copolymerization takes place in the presence of Lewis acids or similarly acting acids and is thus ionically catalyzed. The products obtained have average molecular weights between about 500 and 2000.

The production of corresponding vinyl copolymers is also known from DE-OS No. 1 770 144, from DE-OS No. 1 795 840 and from U.S. Pat. No. 3,687,895. The copolymerization may be both ionically and radically catalyzed (page 4 of DE-OS No. 1 770 144).

According to formula II on page 3 of DE-OS No. 1 770 144, the molecular weights (number average) $\overline{M}n$ may be between about 3000 (1=5 and r=5) and about 20 000 000 (1=200 and r=1000), although $\overline{M}n$ values (number average molecular weights) of only 5000 are reached in Examples $M_7$ and $M_8$ (cf. amended DE-AS No. 1 770 144, column 8). In addition, the grafted-on polycarbonate chains in the corresponding Examples 12 and 13 of DE-AS No. 1 770 144 only reach a degree of polymerization of 5.5 and 14.3, respectively, whereas according to formula I a degree of polymerization of 5 to 100 is possible.

In other words, although the grafted vinyl copolymers according to the present invention fall within the general formula of DE-AS No. 1 770 144 or U.S. Pat. No. 3,687,895, the necessary criteria, namely $\overline{M}n$ of the graft base from 45 000 to 95 000, recurring carbonate structural units of 35 to 70 in the side chains and ratios by weight of polycarbonate chains to graft base between 65% by weight to 35% by weight and 45% by weight to 55% by weight, are never specifically disclosed together in the patent specification. At least one of these criteria is never satisfied.

Corresponding vinyl copolymers having average molecular weights $\overline{M}n$ (number average) of 10 000 to 200 000 and preferably 20 000 to 50 000 are also known from U.S. Pat. No. 3 856 886 (column 2, lines 10 to 16 of U.S. Pat. No. 3 856 886). Polycarbonates are also grafted onto these vinyl copolymers, cf. the already cited U.S. Pat. No. 3,687,895.

Although, once again, the grafted vinyl copolymers according to the present invention fall within the general formula of U.S. Pat. No. 3,856,886, the three requirements to be satisfied are never specifically disclosed together in the patent specification. At least one of these requirements is never satisified.

According to U.S. Pat. No. 3,856,886, the grafted vinyl copolymers are mixed with vinyl polymers and-/or thermoplastic polycarbonates.

Now, it can be seen from the Examples of this US patent that only graft polymers containing a little graft base are selected for the mixtures with vinyl polymers, i.e. with polystyrene for example (in Examples 1 to 7a only 5% by weight graft base).

It can be seen from Examples 8 to 15 that the quantity of graft base in the grafted vinyl polymers is higher for the mixtures with thermoplastic polycarbonates, i.e. between 10 and 30% by weight.

According to Examples 16 to 24, the graft copolymers used have a graft base of only 5% by weight.

The mixtures of the grafted vinyl copolymers with other vinyl polymers show no signs of incompatibility and exhibit improved hydrolysis stability, improved flow behavior and improved thermal stability (see column 4, lines 16 to 53 of U.S. Pat. No. 3,856,886 and pages 3/4 of DE-OS No. 2 019 992).

The mixtures of the grafted vinyl copolymers with thermoplastic polycarbonates exhibit improved resistance to alkalis and hot water and, in addition, improved mechanical properties and again show no signs of incompatibility (column 6, lines 47 to 61 of U.S. Pat. No. 3,856,886 and pages 3/4 of DE-OS No. 2 019 994).

The mixtures of the grafted vinyl copolymers with thermoplastic polycarbonates and with other vinyl polymers exhibit improved resistance to alkalis and hot water, improved mechanical and thermal properties and improved flow properties and show no signs of incompatibility (see column 10, lines 4 to 36 of U.S. Pat. No. 3,856,886 and pages 3/4 of DE-OS No. 2 019 993).

Finally, copolymers containing phenol residues as side chains are known from DE-OS No. 1 950 982 and from U.S. Pat. No. 3,758,597. No particulars of the molecular weights of these vinyl copolymer graft bases are provided. In addition, the grafting on of polycarbonate chains is described, the content of graft base in the grafted product of the single Example being 5% by weight.

Corresponding grafted vinyl copolymers are also known from DE-OS No. 2,357,192 and from the corresponding U.S. Pat. No. 391,009. The ungrafted copolymers are said to have a molecular weight ($\overline{M}_n$ determined by osmosis) of 10 000 to 100 000 and preferably of 10 000 to 40 000. The grafted vinyl copolymers described in the Examples contain 10% by weight and 20% by weight, respectively, of copolymer base.

DE-OS No. 2 357 192 and U.S. Pat. No. 3,991,009 describe the mixing of the grafted vinyl copolymers with graft rubbers, the graft rubbers also being understood to include mixtures of pure graft polymers with copolymers and also mixtures of copolymers (see mixture e)).

Finally, polycarbonate-grafted polyvinyl compounds are described in "Angewandte Makromolekulare Chemie" 60/61 (1977), pages 125 to 137 (no. 861). Once again, however, the $\overline{M}_n$ of the graft base is only between 2000 and 4000 while the content of graft base in the grafted vinyl polymer is at most 20% by weight.

In addition, DE-OS No. 2 329 585 (Le A 15 024) describes mixtures of polycarbonates of which at least 50% consists of recurring structural units corresponding to the following formula

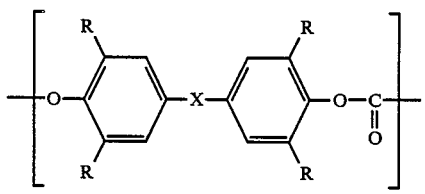

in which R is $C_1$-$C_3$ alkyl and X represents the usual biphenol bonds, with thermoplastic resins, such as polystyrenes, which in some cases show extremely high compatibility as reflected inter alia in the transparency of these mixtures.

EP-A No. 0 181 143 describes mixtures of polycarbonates with poly-(p-methyl styrenes), a content of more than 20% by weight of poly-(p-methyl styrene) in the polycarbonate/poly-(p-methyl styrene) mixture producing signs of incompatibility so that the property spectrum is adversely affected.

By contrast, it has now been found that the grafted vinyl polymers obtainable by the process according to the invention, of which the graft base has an $\overline{M}_n$ of 45 000 to 95 000 and preferably of 60 000 to 80 000, of which the graft base content is between 35% by weight and 55% by weight and preferably between 40% by weight and 50% by weight, based on the total weight of grafted vinyl copolymer, including grafted-on polycarbonate chains, and of which the polycarbonate chains have a degree of polycondensation of recurring carbonate structural units of 35 to 70, are excellent compatibility promoters for polycarbonate-polystyrene mixtures, so that such mixtures may be used for optical purposes, more especially for optical discs.

Accordingly, the present invention relates to the grafted vinyl copolymers obtainable by the process according to the invention and to their use as modifiers for mixtures of thermoplastic polycarbonates and thermoplastic polystyrenes.

The present invention also relates to mixtures of (A) 70 to 20% by weight and preferably 65 to 40% by weight of a thermoplastic aromatic polycarbonate based on diphenols corresponding to the following formula

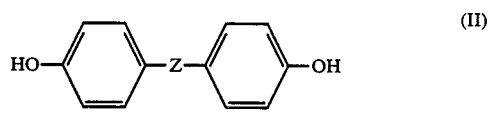

in which

Z is a single bond, a $C_1$-$C_8$ alkylene radical, a $C_2$-$C_{12}$ alkylidene radical, a cyclohexylidene radical, a benzylidene radical, a methylbenzylidene radical, a bis-(phenyl)methylene radical, —S—, —SO$_2$—, —CO— or —O—, with $\overline{M}_w$ values (weight average molecular weights determined in known manner via the relative solution viscosity) of 15 000 to 120 000, preferably 20 000 to 80 000 and more preferably 25 000 to 45 000 and (B) 30 to 80% by weight and preferably 35 to 60% by weight of a thermoplastic polystyrene having an value (weight average molecular weight determined in known manner by gel permeation chromatography) of 20 000 to 400 000, preferably 30 000 to 330 000 and more preferably 60 000 to 260 000, characterized in that they contain 0.5% by weight to 15% by weight, preferably 1.0% by weight to 12% by weight and more preferably 2% by weight to 9% by weight, based in each case on 100% by weight (A)+(B), of grafted vinyl copolymer obtainable in accordance with the invention.

BRIEF DESCRIPTION OF THE DRAWINGS

FIG. 3 is a LM micrograph of Example 4 (magnification×500),

FIG. 4 is a TEM micrograph of Example 4, magnification×7500,

FIG. 5 is a LM micrograph of Example 5, magnification×500 and

FIG. 6 is TEM micrograph of Example 5, magnification×7500.

Figure 1:
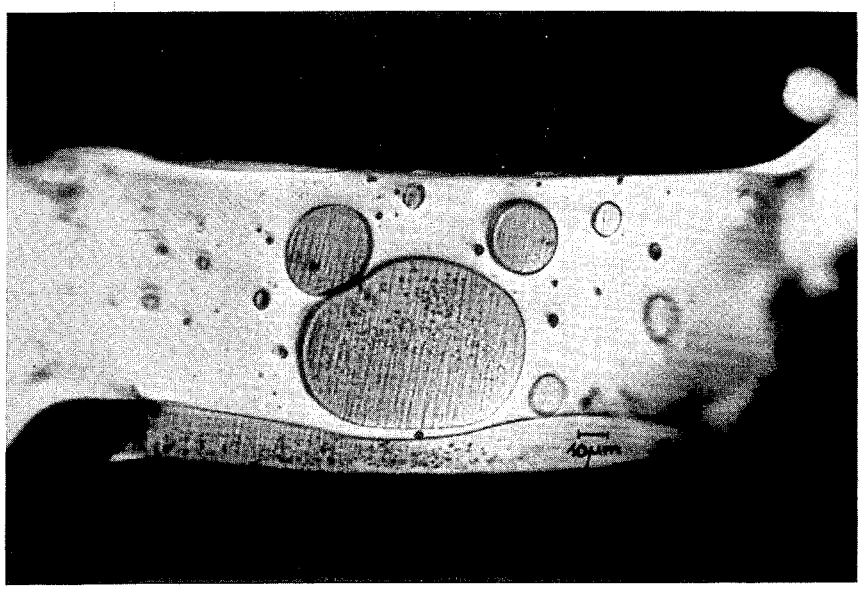
FIG. 1 is a light microscope micrograph (LM), —magnification×500 of comparison Example 1.

According to Japanese published application Sho 61-19656 of Mitsubishi, mixtures of polycarbonates with polystyrenes are unsuitable for optical purposes because they are white-speckled and cloudy (see Comparison Example 3 of Sho 61-19 656).

EP-A No. 0 199 824 describes optical resin materials. These materials may consist of mixtures of resins to which small quantities of a third substance may be added to improve the compability of the mixtures (page 11 of EP-A No. 0 199 824). For example, a polystrene-polycarbonate block copolymer is used as this third substance in mixtures of bisphenol A polycarbonate with stryene-maleic anhydride copolymer in Example 2 of EP-A No. 0 199 824. The possibility of mixtures of polycarbonate and polystryene is discussed in EP-A No. 0 199 824, but not verified (pages 7, 8 and 11 of EP-A No. 0 199 824). Graft copolymers are also suitable as optical resin materials in the context of EP-A No. 0 199 824 (page 9, middle to page 11, paragraph 1 of EP-A No. 0 199 824 and Example 4 of EP-A No. 0 199 824). There is no suggestion in EP-A No. 0 199 824 of the special grafted vinyl copolymers according to the present invention.

Nor was it obvious to use the grafted vinyl copolymers according to the present invention as particularly suitable modifiers because it can be seen from the Examples of U.S. Pat. No. 3,856,886 that, on the one hand, grafted vinyl copolymers containing a low percentage of vinyl copolymer graft base are used for corresponding three-component mixtures while, on the other hand, graft products containing a relatively high percentage of vinyl copolymer graft base are used for mixtures of thermoplastic polycarbonates with grafted vinyl copolymers.

Accordingly, the addition of additional vinyl polymer results mainly in a reduction in the content of graft base in the grafted vinyl copolymer for the production of compatible mixtures of polycarbonates and vinyl polymers.

For this reason, it was not obvious to the expert to establish improved compatibility between thermoplastic polycarbonate and polystyrene by using grafted vinyl copolymers of which the vinyl copolymer graft base is increased, i.e. is between 35% by weight and 55% by weight, to obtain optimal compatibility for optical applications, i.e. mixtures of low optical anisotropy.

Accordingly, the present invention also relates to the use of the mixtures according to the invention of components (A),(B) and the grafted vinyl polymers as substrates for optical dics.

The compounds of formula (I) required for the preparation of the vinyl copolymers according to the invention are either known or may be obtained by kniwn methods (see for example H. Niederprüm, P. Voss, Beyl, Liebigs Ann., 1973, 20–32 and Japan Kokai Tokyo Koko 79/122 257).

Examples of compounds such as these include 3-trimethyl siloxystyrene, 4-trimethyl siloxystyrene, 3-trimethyl siloxy-α-methyl styrene, 4-trimethyl siloxy-α-methyl styrene, 2-methyl-4-trimethyl siloxystyrene, 2-methyl-4-trimethyl siloxy-α-methyl styrene, 2,6-dichloro-4-trimethyl siloxy-α-methyl styrene, 3-trimethyl siloxyallylbenzene, 4-trimethyl siloxyallylbenzene and 4-trimethyl siloxyphenyl allylether.

One method of preparing the compounds corresponding to formula (I) comprises reacting the corresponding phenols (1a) which correspond to the compounds of formula (I), except that X is OH, with hexamethyl disilazane at 150° C. (H. Niederprüm, P. Voss, V. Beyl, Liebigs Ann., 1973, 20–32).

The radically initiated mass polymerization may be carried out, for example, as follows:

To 95–99.5 mole % of an aromatic vinyl compound and 0.5–5 mole % of a compound corresponding to formula (I) is added in a nitrogen atmosphere 0.05–0.25% by weight α, α'-azodiisobutyronitrile, based on the quantity by weight of aromatic vinyl compound used, followed by polymerization for 20–40 hours at 60°–100° C. The reaction conditions in regard to temperature and initiator concentration correspond to those of known processes (cf. also Houben-Weyl Vol. 14/1, "Makromolekulare Stoffe" page 753 et seq., Georg Thieme Verlag, Stuttgart 1962).

The polymerization time depends on the proportion of comonomers corresponding to formula (I) and the desired molecular weight of the vinyl copolymer graft base. Where the desired molecular weight of the graft base is high for a high proportion of compounds corresponding to formula (I), the polymerization time selected should be longer than where the desired molecular weight of the graft base is relatively low and/or where the proportion of compounds corresponding to formula (I) is low.

The resulting, still ungrafted copolymers thus consist of bifunctional structural units corresponding to the following formula

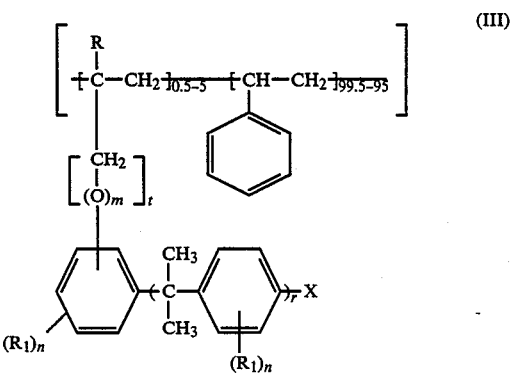

in which

R, $R_1$, m, n, r, t and X have the meanings defined for formula (I).

The diphenols suitable for the graft reaction are the diphenols normally used in the known production of thermoplastic polycarbonates, preferably those corresponding to the formula (IV) HO—D—OH where D is a two-bonded organic radical containing from 6 to 30 carbon atoms, and more preferably those corresponding to formula (II).

Examples of suitable diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane and 1;1-bis-(4-hydroxyphenyl)-cyclohexane, also polydialkylsiloxane diphenols of the type corresponding to formula (IIa) below.

The graft side chains may contain one or more diphenols in co-condensed form. It is pointed out in this connection that the diphenols of formula (IIa) are present in the side chains in a quantity of at most 20% by weight, based on the total weight of the polycarbonate side chains.

Suitable monophenols of the chain terminators are, for example, phenol, p-tert.-butylphenol, p-cumylphenol and p-isooctylphenol.

Inert organic solvents for the grafting reaction are, for example, methylene chloride and chlorobenzene.

The quantity by weight of inert solvent is about 20 to 25 times the quantity by weight of graft base used in the grafting reaction. The quantity of solvent depends on the particular quantity by weight of graft base used in the graft to be produced. For a small quantity of graft base, a relatively small quantity of solvent is sufficient; for a relatively large quantity of graft base in the graft, a relatively large quantity of solvent is required. The quantity of solvent should of course be selected so that the final viscosity obtained falls within the range mentioned at the beginning.

Aqueous sodium hydroxide or potassium hydroxide for example is used as the aqueous alkaline phase.

Suitable catalysts are, for example, tertiary amines such as, for example, triethylamine, or N-ethylpiperidine.

The resulting, grafted copolymers thus contain structural units corresponding to formula (IIIa) which correspond to the structural units of formula (III), except that

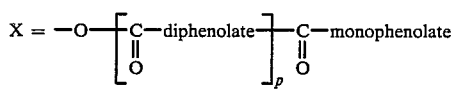

in which p is an integer of 35 to 70 and diphenolate and monophenolate are residues such as

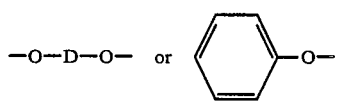

which naturally emanate from the reaction with p in aqueous alkaline phase, i.e. are residues obtained by removal of the phenolic H-atoms from diphenols and monophenols.

The grafting reaction according to the invention leaves it open whether all the graft sites X of the graft base participate in the grafting reaction; in some cases, pure polycarbonate may accumulate in small amounts.

The polycarbonates to be used as component A) are known as such or may be obtained by known methods (see H Schnell "Chemistry and Physics of Polycarbonates", Interscience Publishers, New York, 1964).

Polycarbonates based on diphenols corresponding to formula (II) are those which contain at least 80% by weight, based on the molar sum of the diphenols to be used, of diphenols corresponding to formula (II) in co-condensed form.

Other preferred diphenols, which are used in quantities of at most 20% by weight, based on the molar sum of the diphenols to be used, are those corresponding to the following formula (IIa)

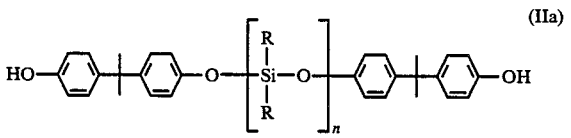

(see EP-No. 0122 535) in which

R=$C_1$-$C_6$ alkyl preferably $CH_3$— and n=20 to 200 and preferably 40 to 80.

Preferred diphenols corresponding to formula (II) are 2,2-bis-(4-hydroxyphenyl)-propane and 1,1-bis-(4-hydroxyphenyl)-cyclohexane.

Suitable diphenols of formula (IIa) are, for example,

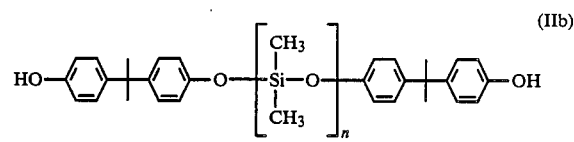

in which n=40, 60 or 80.

Suitable chain terminators for the preparation of the polycarbonates of component (A) are, for example, phenol, p-tert.-butylphenol and p-isooctylphenol.

The polycarbonates of component (A) are both homopolycarbonates and copolycarbonates.

The aromatic polycarbonates of component (A) may be both linear and branched.

Branching may be effected in known manner by incorporation of small quantities, preferably 0.05 to 2.0 mole %, based on diphenols used, of trifunctional or more than trifunctional compounds, for example those containing three or more than three phenolic hydroxy groups.

Polycarbonates such as these are known (see for example DE-PS No. 2 500 092 and U.S. Pat. No. 4,185,009.

Some of the compounds containing three or more than three phenolic hydroxy groups which may be used in accordance with the invention are, for example, phloroglucinol, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, 2,6-bis-(2-hydroxy-5-methylbenzyl)-4-methylphenol, 2-(4-hydroxyphenyl)-2-(2,4-dihydroxyphenyl)-propane and 1,4-bis-(4,4'-dihydroxytriphenylmethyl)-benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

Both a polycarbonate as such and also a mixture of various polycarbonates may serve as component (A).

Polystyrenes (component (B)) are both homopolymers and also copolymers. They are either known as such or may be obtained by known methods. Suitable monomers for the polystyrenes to be used in accordance with the invention are, above all, styrene itself, o-, p- and m-methyl styrene, p-ethyl styrene, 2,4-dimethyl styrene, o-chlorostyrene, 2,5-dichlorostyrene, vinylnaphthalene and vinylbiphenyl.

Examples are the corresponding homopolymers of the monomers mentioned.

Examples of copolymers are styrene/α-methyl styrene copolymers, styrene/p-methyl styrene copolymers, copolymers of various methyl styrene isomers ("vinyltoluene"), even in combination with styrene, and copolymers of styrene and divinylbenzene.

Preferred styrene polymers are the homopolymers of styrene, p-methyl styrene and o-chlorostyrene and copolymers of styrene and α-methyl styrene, copolymers of styrene and p-methyl styrene, polyvinyltoluenes of various vinyltoluenes, optionally in combination with styrene.

Both a polystyrene as such and also a mixture of various polystyrenes may serve as component (B).

To prepare the mixtures according to the invention, the polycarbonte component, the polystyrene component and the graft copolymer component may be mixed above the softening temperature of the polycarbonate used. This may be done in a single step, for example by compounding during extrusion in standard screw extruders, for example at temperatures of 280° to 350° C.

Known machines are suitable for compounding, twin-screw extorters preferably being used.

It is obvious that the stabilizer systems and/or mold release agents normally used for polycarbonate or polystyrene may be used as required in polymer mixtures of the type in question and may be incorporated in known manner by compounding, as described above.

The use of plastics or mixtures of plastics as substrates for optical discs presupposes the following:

The information on optical discs is read by the linearly polarized light of a laser and, in the case of recordable discs, is also recorded in that way. One of the systems for recordable and erasable methods are the magneto-optical discs. In their case, particular emphasis has to be placed on a substrate material free from double refraction, because even minimal rotation (less than 1°) of the plane of oscillation of the light is read as a signal.

In plastics (thermoplasts), double refraction consists essentially of two factors, namely: a material-specific component on the one hand and a processing-related component (also known as orientation double refraction) on the other hand.

Accordingly, thermoplastic moldings of low double refraction may be produced by two measures either by the choice of suitable processing parameters, for example by processing of low-viscosity types at relatively high temperature, as for example in the injection molding or injection stamping of audio compact discs of thermoplastic polycarbonate or by the use of a material which, in itself, shows only a minimal tendency towards double refraction, such as for example polymethyl methacrylates which are used for the manufacture of video discs.

Recordable storage techniques, such as magneto-optical systems for example, require relatively high energy for recording to obtain an acceptable signal-to-noise ratio. A lens of large numerical aperture is used for this purpose. Due to the aperture angle of the recording and reading lens, considerable significance is attributed to minimal optical anisotropy, end for the tangential and radial beam trend. Thus, compact discs which already show very low pitch differences in double refraction (below 10 nm/mm) in the axial direction, still show high measured values, typically of 500 to 1000 nm/mm, in the tangential and radial direction.

It is known that, in general, the double refraction of a polymer may be reduced by adding a polymer of opposite double refraction (J. Hennig, Lecture at the Conference on "New Polymers" in Bad Nauheim, 14/15.04.1986: "Polymers as Substrates for Optical Discs").

It is also known that, in principle, a material of low double refraction can be obtained by combining polycarbonate and modified polystyrene (Nikkei Sangyo-Industry Daily of 07.02.1986 "Sumitomo Chemical Developed New Resin for Erasable Optical Disc").

The use of the mixtures according to the invention as substrates for optical discs may be explained as follows:

The "substrate" for optical discs in the context of the invention is the material of the mechanical foundation of a disc which serves both as a carrier for a layer or plane of information and also as the spacer between this information-carrying surface and the outer flat surface of the disc.

Both for reading and for recording, the information-carrying light beam has to pass through the substrate unchanged en route from the flat surface of the disc to the opposite data side and, in the case of the reading beam, from the data side back—after information transfer—to the outer surface from which it passes to the detector.

Examples of optical discs are audio compact discs and video discs.

EXAMPLES

A Preparation of the graft copolymers

EXAMPLE 1

(a) Graft base obtained by mass copolymerization under nitrogen of 1950 g styrene and 50 g 4-trimethyl siloxy-α-methyl styrene in the presence of 2 g α,α'-azodiisobutyronitrile over a period of 29 hours at 80° C.

The average molecular weight ($\overline{M}_n$) determined by gel permeation chromatography was 68,377 g/mole.

(b) Grafting reaction 1.1 kg (11.1 moles) phosgene are introduced with stirring over a period of 1 hour at 20° to 25° C. into a mixture of 2223 kg (9.75 moles) 2,2-bis-(4-hydroxyphenyl)-propane (BPA); 43.9 g ( 3 mole %, based on BPA) p-tert.-butylphenol; 2.3 kg 45% sodium hydroxide; 40 liters water, 20 kg chlorobenzene and 1.95 kg of the graft base a) dissolved in 20 kg methylene chloride. 19 ml ( 1 mole %, based on BPA) N-ethyl piperidine are then added, followed by stirring for 1 hour. The organic phase is separated off, washed free from electrolyte and extruded at 300° C. after removal of the methylene chloride by distillation. 3.9 kg of product having a relative solution viscosity $\pi_{rel}$ of 1.482 were obtained. The calculated molecular weight of the polycarbonate side chain/ grafting site was $\overline{M}_n = 13.293$ g/mole, corresponding to a degree of polycondensation of 52.

EXAMPLE 2

(a) Graft base obtained by mass copolymerization under nitrogen of 222 g vinyltoluene and 5 g 4-trimethyl siloxy-α-methyl styrene in the presence of 0.2 g α, α'-azodiisobutyronitrile over a period of 24 hours at 80° C. The average molecular weight ($\overline{M}_n$) determined by gel permeation chromatography was 63 219 g/mole.

(b) Grafting reaction 15 g (0.15 mole) phosgene are introduced over a period of 30 minutes with stirring at 20° to 25° C. into a mixture of 22.8 g (0.1 mole) 2,2-bis-(4-hydroxyphenyl)-propane (BPA); 450 mg (=3 mole %, based on BPA) p-tert.-butylphenol; 20 g (0.5 mole) sodium hydroxide; 400 ml water and 20 g of the graft base (b) dissolved in 400 ml methylene chloride. After addition of 0.14 ml N-ethyl piperidine, the mixture is stirred for 30 minutes. The organic phase is separated off, washed free from electrolyte, dried and concentrated. 43.8 g of product having a solution viscosity $\pi_{rel}$ of 1.328 were obtained.

The calculated molecular weight of the polycarbonate side chain/grafting site is 10 459 g/mole, corresponding to a degree of polycondensation $\overline{p}$ of 41.

B Preparation of the mixtures

The materials used in the Examples and Comparison Examples are described in the following.

The solution viscosities mentioned were determined in methylene chloride (5 g/l) at 25° C.

(I) Polycarbonate (PC) of bisphenol A prepared in accordance with DE No. 2 842 005, relative solution viscosity $\pi_{rel}$ 1.20 (measured in methylene chloride, 5 g/l, at 25° C.), corresponding to an $M_w$ of 18 500

(II) polystyrene (PS), relative solution viscosity $\pi_{rel}$ 1.597, corresponding to an $M_w$ of 350 000.

(III) polyvinyltoluene (PVT), relative solution viscosity $\pi_{rel}$ 1.328, corresponding to an $M_w$ of 155 000.

Sample preparation for the morphological examinations of the mixtures according to the invention and of the Comparison Examples was carried out by compounding of the individual components in solution. 50 μm cast films were prepared from these solutions by known methods, ultramicrotome cuts subsequently being prepared from these cast films using an LKB Ultratome III. This method of sample preparation was intended to guarantee that the photomicrographs provide a representative picture of the thermodynamic equilibrium state of the polymer mixtures. The morphology of the polymer blends was studied in a light microscope (Leitz Dialus Pol) in polarized transmitted light and in a transmission electron microscope (Philips EM 400).

Polymer mixtures rich in polycarbonate consisting of 60% by weight polycarbonate and 40% by weight styrene polymers are described in the following Examples.

In the polymer mixtures according to the invention in Examples 3 to 6, the total quantity of 60% by weight of polycarbonate is the sum total of the proportion by weight of polycarbonate in the quantity of graft copolymer added plus the quantity of homopolycarbonate added. Accordingly, the total quantity of styrene polymers of 40% by weight is the sum total of the proportion by weight of styrene polymers in the quantity of graft copolymer added plus the quantity of styrene polymers added.

In the light-microscope micrographs (hereinafter referred to as LM micrographs), the continuous polycarbonate matrix appears lighter in the polarized transmitted light than the styrene polymers present in disperse phase. By contrast, in the transmission electron micrographs, the polycarbonate matrix appears darker than the dispersed styrene polymer phase. The better compatibility of the mixtures according to the invention was evaluated from the domain size of the styrene polymer phase determined from the transmission electron micrographs (hereinafter referred to as TEM micrographs).

COMPARISON EXAMPLE 1

60 parts polycarbonate and 40 parts polystyrene are in 1000 parts methylene chloride. A 50 μm cast film was prepared from this solution. LM=FIG. 1, magnification×500.

COMPARISON EXAMPLE 2

It was not possible to prepare a film suitable for morphological examinations from a solution of 60 parts polycarbonate, 40 parts polyvinyltoluene and 1000 parts methylene chloride because the high tendency towards delamination means that the individual polymers in the film form separate layers.

EXAMPLES 3-5

55 parts polycarbonte, 35 parts styrene polymer and 10 parts graft copolymer were dissolved in 1000 parts methylene chloride and 50 μm cast films prepared from the resulting solutions. The exact composition of the polymer mixtures according to the invention in % by weight and the average domain size are shown in Table 1.

Figure 2:
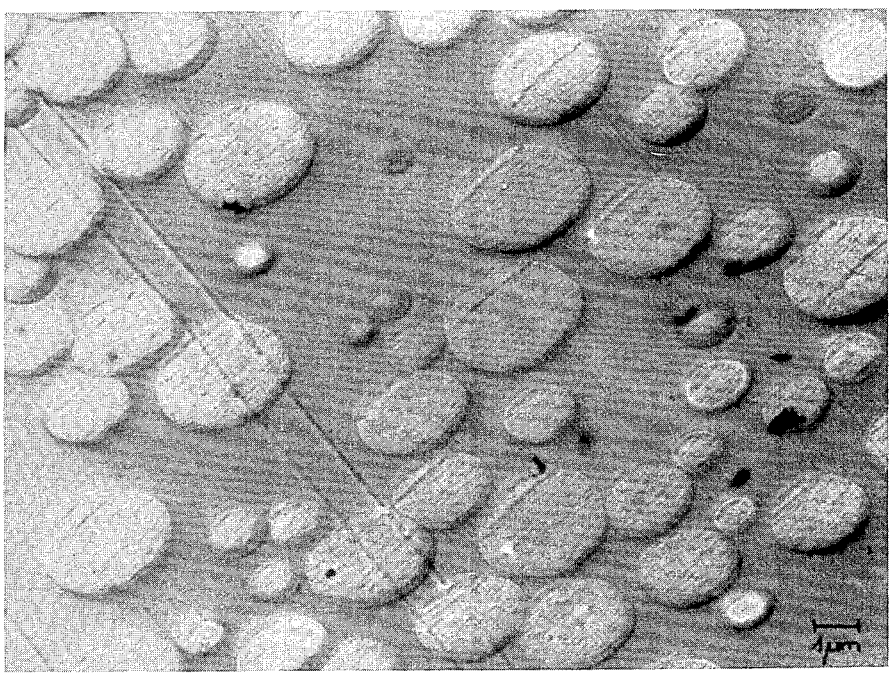
FIG. 2 is a transmission electromicrograph (TEM) of Example 3.

TEM micrograph of Example 3 = FIG. 2, magnification

LM micrograph of Example 4 = FIG. 3, magnification × 500

TEM micrograph of Example 4 = FIG. 4, magnification × 7500

LM micrograph of Example 5 = FIG. 5, magnification × 500

TEM micrograph of Example 5 = FIG. 6, magnification × 7500.

TABLE 1

Composition and domain size of the styrene polymer phase in Comparison Examples 1 and 2 and in Examples 3-5.

| Examples | PC | PS | PVT | Graft copolymer Ex. 1 | Graft copolymer Ex. 2 | Domain size in μm |
|---|---|---|---|---|---|---|
| Comparison Example 1 | 60 | 40 | — | — | — | 6-80 |
| Comparison Example 2 | 60 | — | 40 | — | — | cannot be determined |
| Examples | | | | | | |
| 3 | 55 | 35 | — | 10 | — | 0.5-3.0, |
| 4 | 55 | — | 35 | 10 | — | 0.6-5.3 |
| 5 | 55 | — | 35 | — | 10 | 1.6-5.3 |

EXAMPLE 6

Varying amounts of polycarbonate (I), polystyrene (II) and graft copolymer of Example 1 were mixed by compounding at 270°-290° C. in a ZSK 32. Compact discs were injection-molded from the compounds obtained at a melt temperature of 340° C. The double refraction of the mixtures was evaluated by measurement of the difference in pitch as a function of the space directions in the middle between the axis and edge of the disc (Table 2).

TABLE 2

Double refraction of compact disc (120 mm φ) of polycarbonate (I)/polystyrene (II) Graft copolymer of Example 1 Measurements of the difference in pitch in the middle between the axis and edge of the disc in transmitted light (axial) and at the tangential and radial cross-sections.

| Substrate composition in % by weight | | | Difference in pitch/mm — mm$^{-1}$ Transmitted light | | |
|---|---|---|---|---|---|
| PC (I) | PS (II) | graft copolymer of Example 1 | (axial) | tangential | radial |
| 58.75 | 38.75 | 2.5 | 41 | 139 | −157 |
| 57.50 | 37.50 | 5.0 | 17 | 132 | −158 |
| 55.00 | 35.00 | 10.0 | 34 | 163 | −185 |

We claim:

1. A mixture of
(A) 70 to 20% by weight of a thermoplastic aromatic polycarbonate based on diphenols corresponding to the following formula

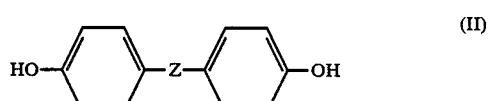

(II)

in which Z is a single bond, a $C_1$-$C_8$ alkylene radical, $C_2$-$C_{12}$ alkylidene radical, a cyclohexylidene radical, a benzylidene radical, a methylbenzylidene radical, a bis-(phenyl)-methylene radical, —S—, —SO$_2$—, —CO— or —O—, having $\overline{M}w$ values (weight average molecular weights determined in known manner via the relative solution viscosity) of 15,000 to 120,000 and (B) 30 to 80% by weight of a thermoplastic polystyrene having an $\overline{M}w$ value (weight average molecular weight determined in known manner by gel permeation chromatography) of 20,000 to 400,000, characterized in that they contain 0.5% by weight to 15% by weight, based on 100% by weight of (A)+(B), of a vinyl copolymer with a grafted-on polycarbonte chain of which the vinyl copolymer graft base has a number average molecular weight as determined by gel permeation chromatography of 45,000 to 95,000 and the polycarbonate chain has a degree of polycondensation of recurring carbonate structural units of 35 to 70 and in which the ratio by weight of vinyl copolymer graft base to grafted on polycarbonate chain is between 35% by weight to 65% by weight an 55% by weight to 45% by weight, characterized in that 95 mol % to 99.5 % of styrene and 5 mol % to 0.5 mol % of compounds corresponding to the following formula

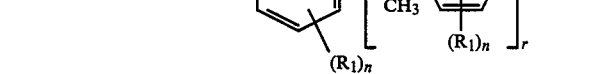

in which R is a hydrogen atom or $C_1$-$C_4$-alkyl, $R_1$ is Cl, Br, $C_1$-$C_4$-alkyl, cyclohexyl or $C_1$-$C_4$-alkoxy, m is 0 or 1, n is 0, 1 or 2, r is 0 or 1, t is 0 or 1 and x is —O—Si(CH$_3$)$_3$, are copolymerized in known manner by radically initiated mass polymerization to a number average molecular weight of 45,000 to 95,000 and the polymer is subsequently reacted without isolation with diphenols, phosgene and monophenols under the conditions of the two-phase interfacial process in aqueous alkaline phase with addition of an inert organic solvent, the quantity of diphenol being selected so that the content of polycarbonate chain in the grafted vinyl copolymer is between 65% and 45% by weight based on the total weight of the grafted vinyl copolymer, including grafted-on polycarbonate chain and the quantity of said monophenols being gauged so that the average chain length of the grafted-on polycarbonate chain comprises 35 to 70 recurring carbonate structural units and the quantity of inert organic solvent having to be gauged in such a way that the final viscosity of the organic phase of the reaction mixture is between 5 and 25 mPa.s.

2. Mixtures as claimed in claim 1, characterized in that they contain 1.0% by weight to 12% by weight grafted vinyl copolymer.

3. Mixtures as claimed in claim 1, characterized in that they contain 2% by weight to 9% by weight grafted vinyl.

* * * * *